United States Patent [19]

Maruyama

[11] Patent Number: 4,983,265
[45] Date of Patent: Jan. 8, 1991

[54] WATER TREATING APPARATUS

[76] Inventor: Sotohiro Maruyama, 8-3, Okbocho 3-Chome, Moriguchi-shi, Osaka, Japan

[21] Appl. No.: 368,358
[22] PCT Filed: Oct. 3, 1987
[86] PCT No.: PCT/JP88/00739
 § 371 Date: Jun. 2, 1989
 § 102(e) Date: Jun. 2, 1989
[87] PCT Pub. No.: WO89/02873
 PCT Pub. Date: Apr. 6, 1989
[51] Int. Cl.$^5$ ............ C25B 1/18; C25B 9/00; C25B 11/03; C25B 11/04
[52] U.S. Cl. .............. 204/269; 204/270; 204/284; 204/292; 204/293; 204/290 R; 204/277
[58] Field of Search .............. 204/248–249, 204/268–269, 270, 284, 149, 275, 290 R, 292–293, 277–278

[56] References Cited

U.S. PATENT DOCUMENTS

| | | | |
|---|---|---|---|
| 1,700,347 | 1/1929 | Blumenberg, Jr. | 204/269 X |
| 3,523,891 | 8/1970 | Mehl | 204/269 X |
| 3,663,413 | 5/1972 | Marmo | 204/269 X |
| 4,197,180 | 4/1980 | Woodward | 204/275 |
| 4,329,211 | 5/1982 | Plantes et al. | 204/269 X |

*Primary Examiner*—Donald R. Valentine
*Attorney, Agent, or Firm*—Klauber & Jackson

[57] ABSTRACT

A water treating apparatus comprising a plurality of treating tanks (2) connected together in series for removing contaminants from a liquid, and an electrode unit (6) disposed at the bottom of each treating tank (2). Water is passed sequentially from the most upstream treating tank toward the most downstream treating tank and is subjected to electrochemical treatment when flowing through the electrode unit (6) of each tank. The electrode unit (6) comprises a tubular case (61) made of an insulating material, and a plurality of electrode plates of a soluble metal each formed with a multiplicity of holes (82) and arranged within the case one above another at a spacing. Current is so passed that the adjacent electrode plates are different in polarity, with the uppermost electrode plate in each upstream treating tank differing in polarity from the lowermost electrode plate in the downstream treating tank adjacent thereto. The water flowing into each tank (2) passes through the electrode plates from a lower opening of the unit (6) to an upper opening thereof and is subjected to oxidation and reduction alternately during this process.

12 Claims, 9 Drawing Sheets

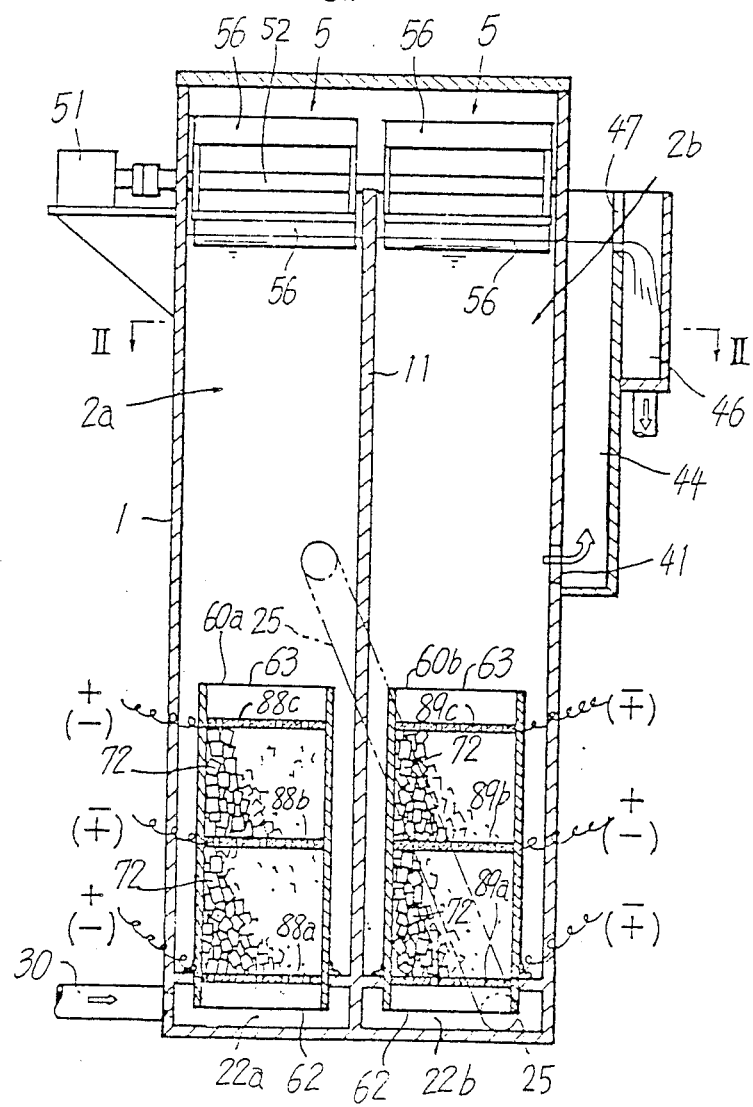

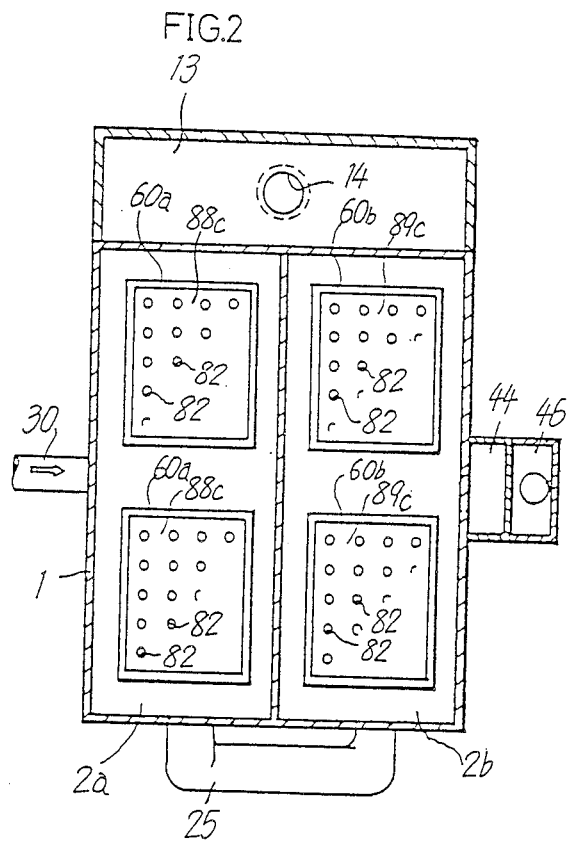
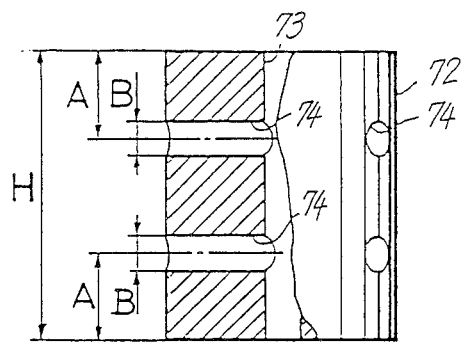
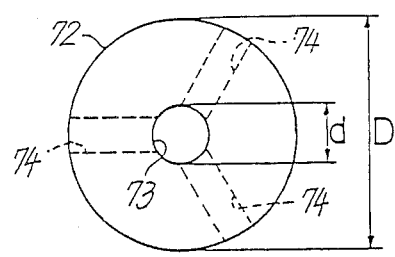

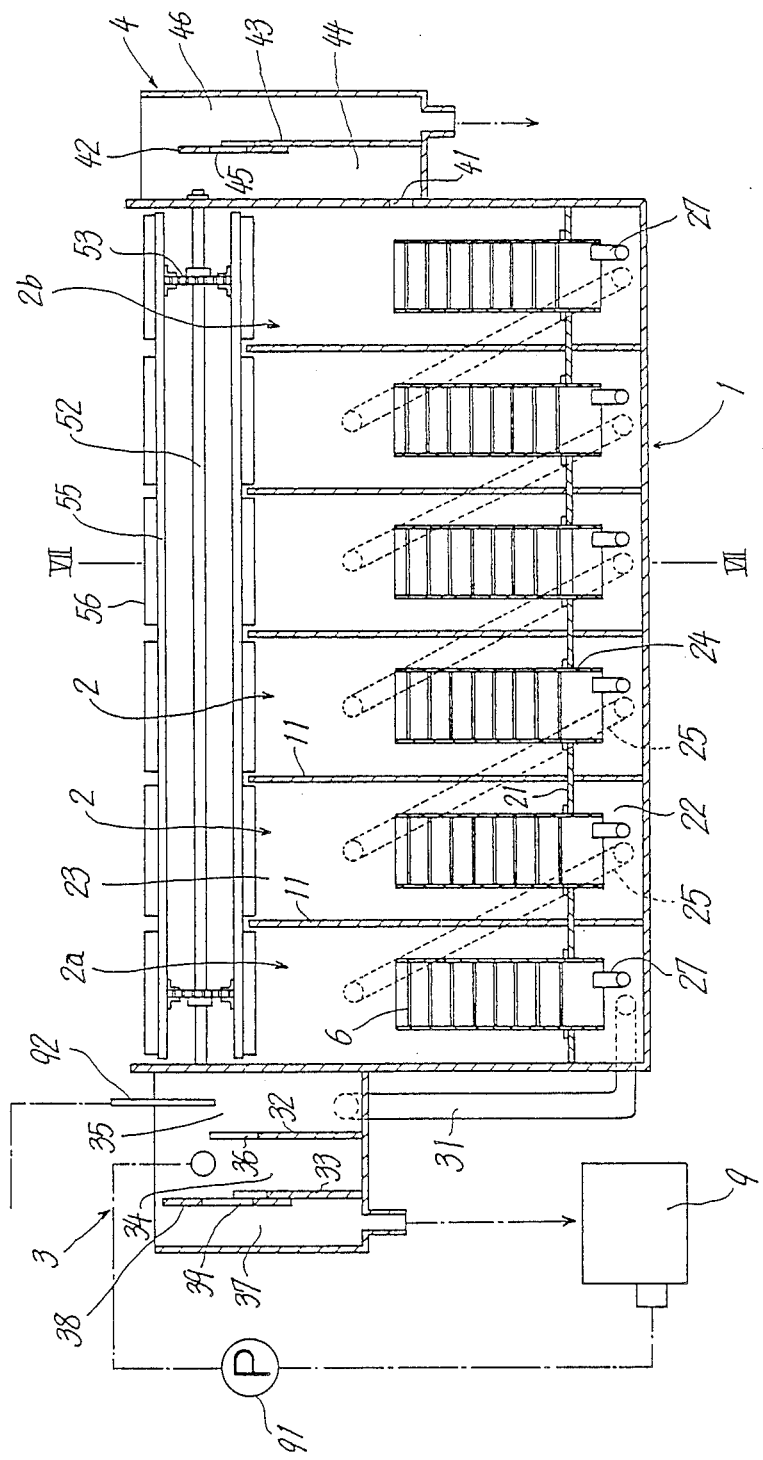

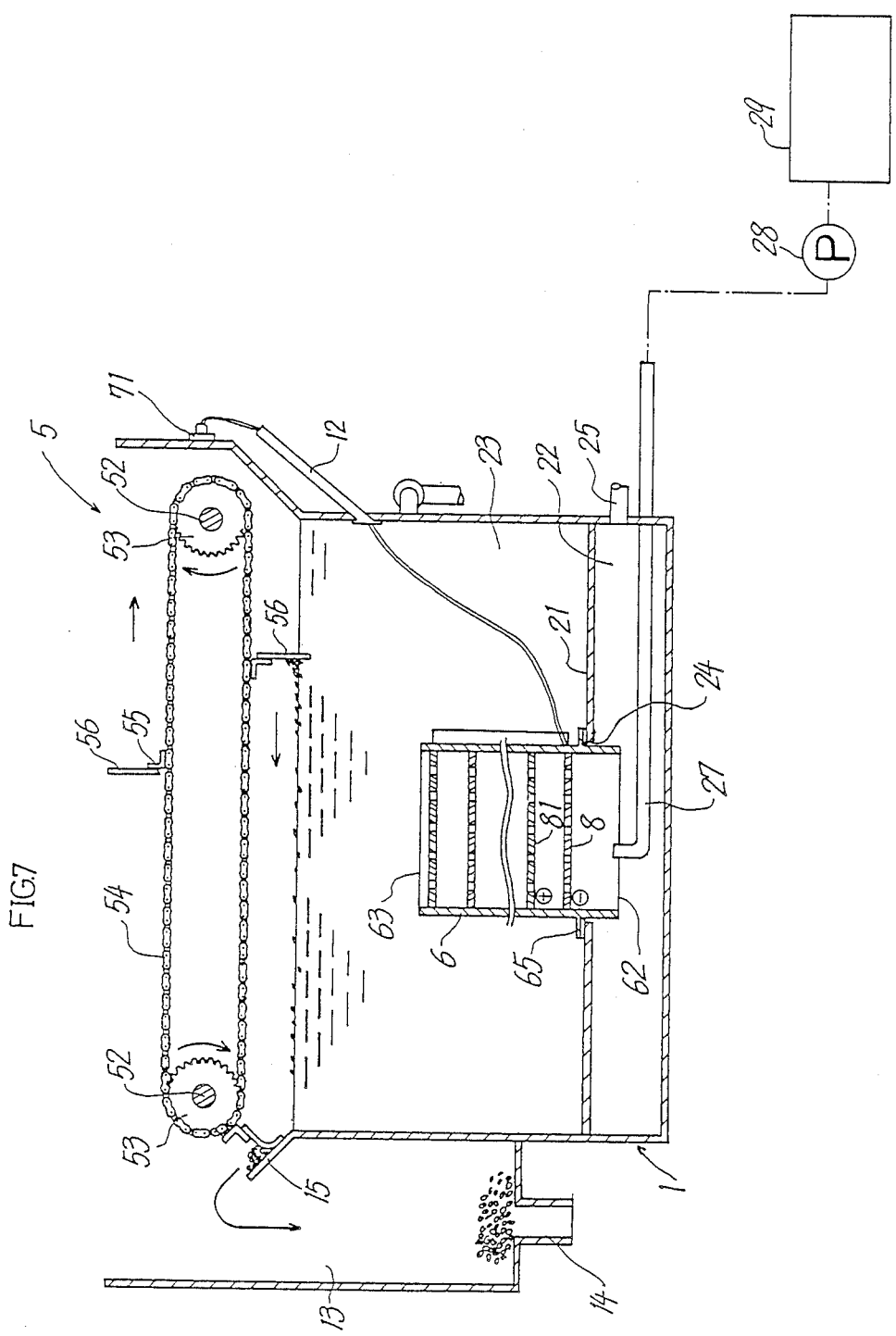

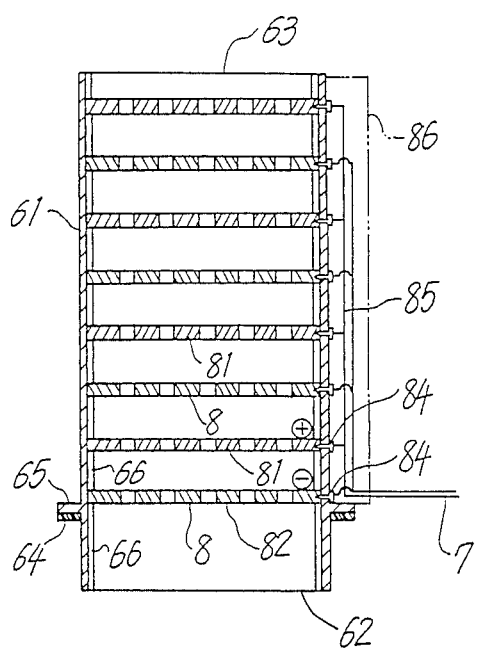
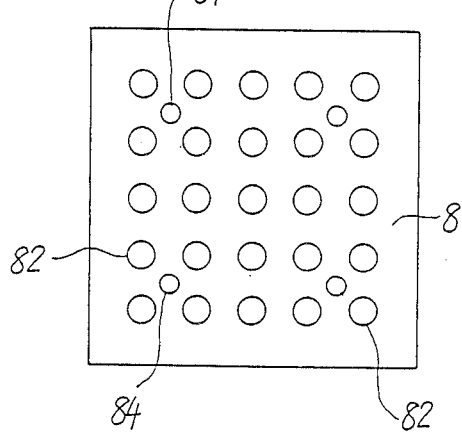
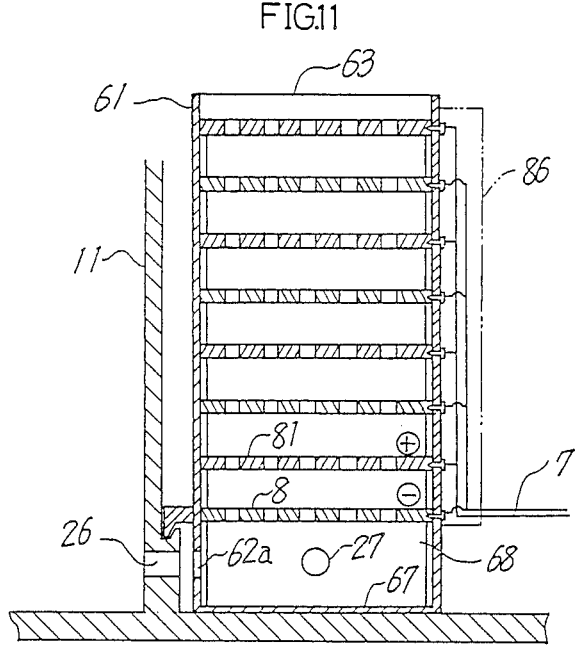

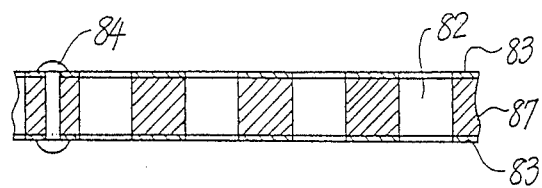
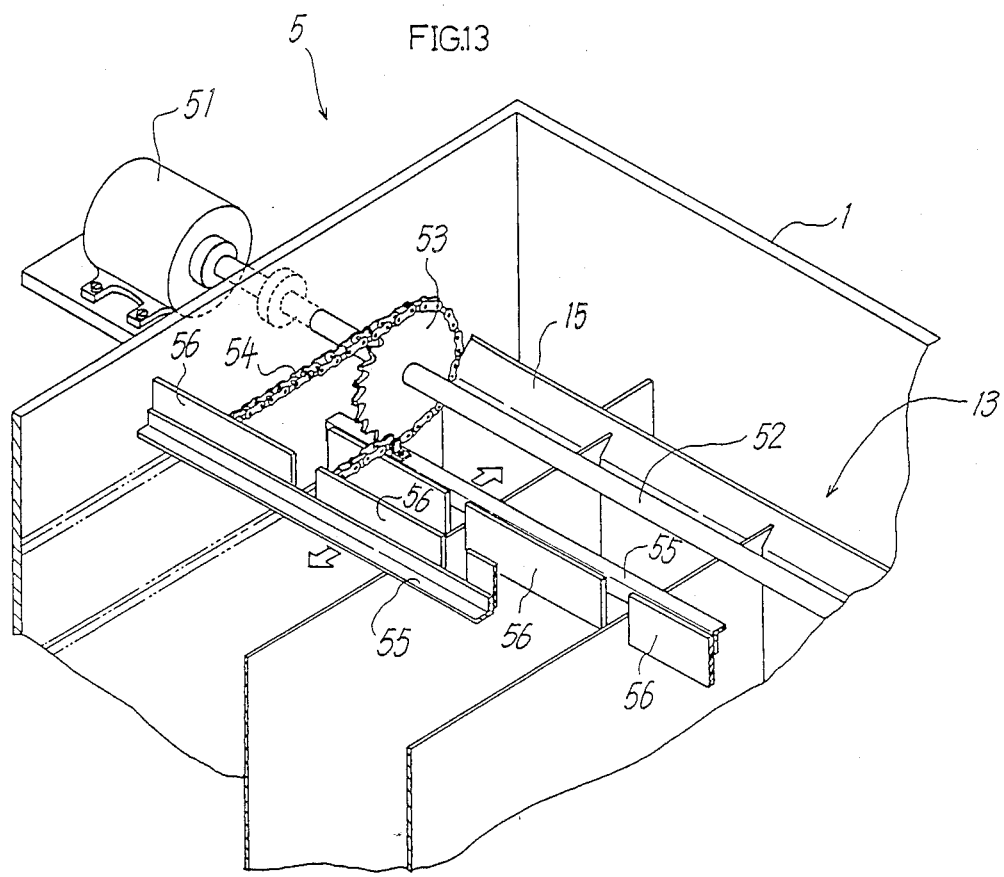

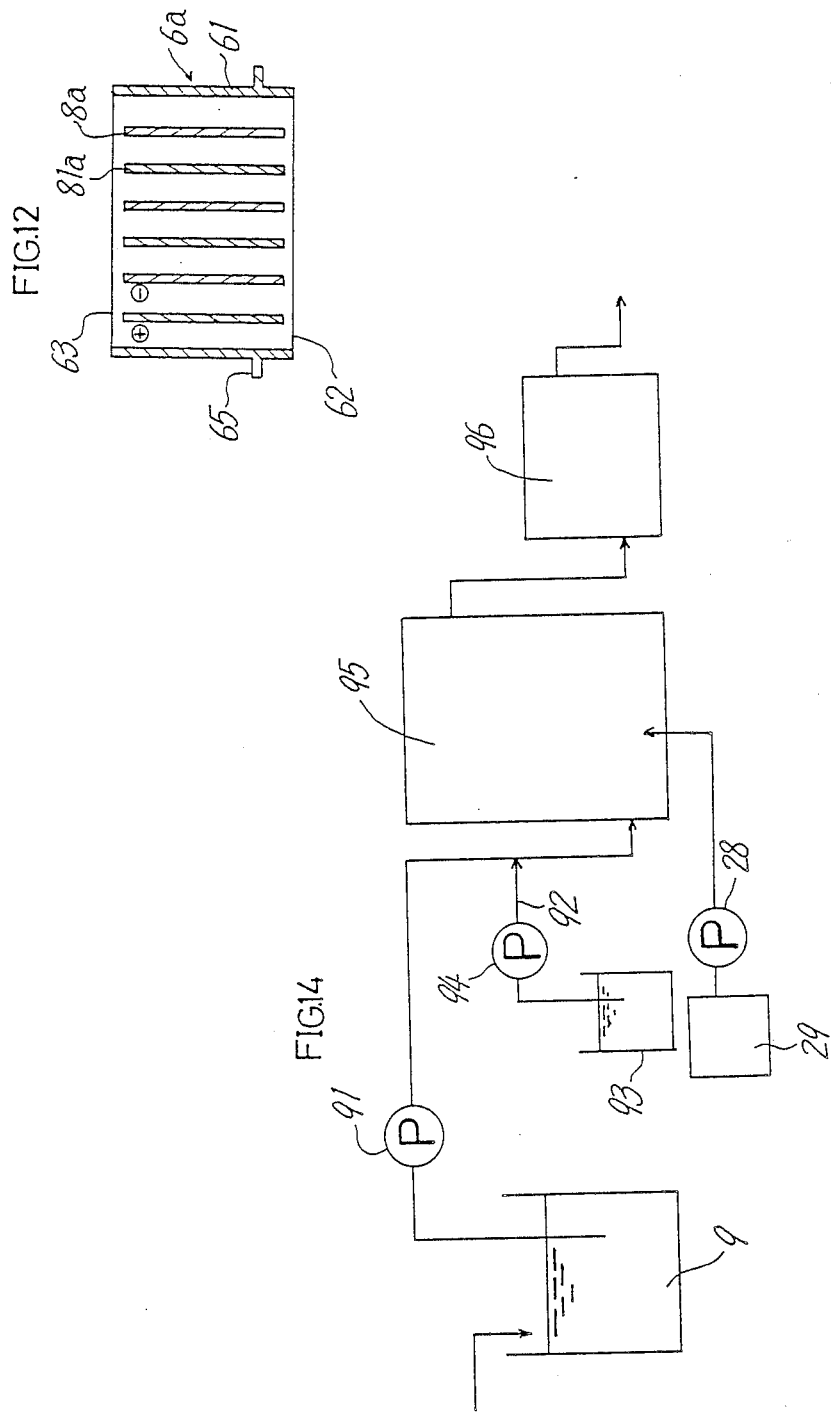

WATER TREATING APPARATUS

TECHNICAL FIELD

The present invention relates to electrical water treating apparatus for removing contaminants from liquids.

BACKGROUND ART

FIG. 15 shows an apparatus heretofore proposed for electrically treating sewage (Unexamined Japanese Patent Publication SHO 59-87093).

The treating apparatus comprises a treating tank 100 made of insulating material and having an influent pipe 105 connected to its lower portion and an effluent pipe 106 connected to its upper portion, and two electrode plates 101, 102 formed with a multiplicity of holes 103 and arranged one above the other within the tank 100 with a spacing provided therebetween. Current is passed between the lower electrode plate 101 serving as a positive electrode and the upper electrode plate 102 as a negative electrode. The electrode plates define an electrolytic chamber therebetween which is packed with a material 107 in the form of a multiplicity of spherical pieces. These pieces are made of a soluble metal, such as an aluminum alloy, having a great ionization tendency.

Sewage containing an additive, such as aluminum chloride, added thereto for ensuring a promoted reaction is supplied to the treating tank 100 through the influent pipe 105. The sewage flows into the electrolytic chamber through the lower electrode plate 101 and moves upward through the clearances between the packed pieces 107 in contact therewith.

While the sewage flows upward through the clearances between the packed pieces 107, the contaminants in the sewage are electrically neutralized and coagulate on separating out. On the other hand, the metal ion dissolves out from the surface of the packed material 107 and reacts with chlorine ion or the like in the sewage to form aluminum hydroxide. The aluminum hydroxide is held to the coagulation through a covalent bond, adsorbed thereby or enclosed therein, gradually forming insoluble flocs. These flocs adsorb hydrogen gas evolved at the negative electrode and oxygen gas produced at the positive electrode, become decreased in apparent specific gravity and float at the upper portion of the treating tank 100.

The contaminants floating in the form of flocs (hereinafter referred to as "scum") flow out through the effluent pipe 106 along with water, forming two layers therewith, and are supplied to a known floatation separation tank (not shown), in which the scum is removed.

The above apparatus further converts the contaminants to harmless and stable substances to achieve a reduction in BOD and COD through an oxidation reaction which occurs when the sewage passes through the positive electrode plate 101 and a reduction reaction which takes place when the sewage flows through the negative electrode plate 103.

However, the electrical sewage treating apparatus has the problem of being inefficient in removing some kinds of contaminants from sewage and failing to achieve a satisfactory removal efficiency in treating sewage containing many kinds of contaminants.

DISCLOSURE OF THE INVENTION

We have conducted various experiments repeatedly to solve the above problem and consequently found that the removal efficiency can be improved very advantageously by effecting electrolytic oxidation and electrolytic reduction separately to accomplish the present invention.

Although the electrochemical reactions occurring in the water treating apparatus of the invention are very complex and still remain to be fully clarified, our experiments and analyses indicate that the advantage of the invention is attributable presumably to the following reason.

When sewage contains various contaminants, it is impossible to remove these contaminants by a single purification process, whereas the water treating apparatus of the invention effectively executes neutralization, oxidation, reduction and coagulation processes individually as will be described below, and the chemical changes involved in these processes affect one another to produce an effect greater than the sum of the effects of the respective processes.

The sewage treating apparatus of the present invention comprises a plurality of treating tanks 2 having an insulated inner surface and connected in series with one another, the most upstream treating tank having an influent opening at its lower portion, the most downstream treating tank having an effluent opening at its upper portion, each of the treating tanks 2 having an electrode unit 6 at its bottom.

The electrode unit 6 comprises a tubular case 61 made of an insulating material and formed with a water inlet 62 and a water outlet 63 in its lower portion and upper portion, respectively, and a plurality of electrode plates each formed with a multiplicity of holes 82 and arranged within the case one above another at a spacing.

Current is passed through the apparatus so that the adjacent electrode plates are different in polarity, with the uppermost electrode plate in each upstream treating tank differing in polarity from the lowermost electrode plate in the downstream treating tank adjacent thereto.

The water to be treated is passed via the influent opening at the bottom of the treating tank into the inlet at the lower portion of the electrode unit, then upward through the holes in the lowermost electrode plate, thereafter through the holes in upper electrode plates successively, and finally through the uppermost electrode plate, thus filling the tank, and is discharged from the effluent opening. Since the electrode unit has the alternating positive and negative electrode plates with current passed therebetween, the ion in the water passing through the negative electrode plate reacts with the ion of the soluble metal dissolving out, while when passing through the positive electrode plate, the water is electrochemically acted on. Thus, the water passing through the electrode unit is electrically acted on by the electrodes positively and negatively alternately in repetition.

The contaminants in the water to be treated have an amount of charge intrinsic to each, so that when the water is merely passed through a single electrode plate, some contaminants are difficult to separate out and remain in the water although other specific contaminants separate out.

When the water to be treated passes through the holes in the electrode plates according to the invention, the water is electrochemically acted on repeatedly with great changes in polarity from positive to negative, and from negative to positive, whereby the contaminants are subjected to greatly changing electrical actions.

Consequently, almost all contaminants have their surface charges neutralized to form numerous metal hydroxide particles.

The metal hydroxide particles readily join to one another upon collision and become progressively flocculated. The flocs adsorb hydrogen gas evolved at the negative electrodes and oxygen gas evolved at the positive electrode, become decreased in apparent specific density and float at the upper portion of the treating tank.

With the water treating apparatus of the present invention, the electrolytic chambers provided between the electrode plates of the electrode unit 6 are packed with a multiplicity of soluble metal pieces each coated with a porous hydroxide film over its surface when so required. Formed between the metal pieces are a multiplicity of clearances for passing therethrough the water to be treated.

The water treating apparatus of the present invention has electrode plates arranged with alternating polarities to electrically effect oxidation and reduction in repetition and is therefore adapted to remove various contaminants from sewage with a higher efficiency than conventional apparatus.

BRIEF DESCRIPTION OF THE DRAWINGS

FIG. 1 is a front view partly broken away and schematically showing a first embodiment of water treating apparatus embodying the invention;

FIG. 2 is a view in section taken along the line II—II in FIG. 1;

FIG. 3 is a front view partly broken away and showing a pipe piece serving as a packed material;

FIG. 4 is a plan view of the same;

FIG. 5 is a front view partly broken away and schematically showing a second embodiment of water treating apparatus embodying the invention;

FIG. 7 is a view in section taken along the line VII—VII in FIG. 5;

FIG. 8 is a view in vertical section of an electrode unit;

FIG. 9 is a plan view of a negative electrode plate;

FIG. 10 is an enlarged view in section of the same;

FIG. 11 is a view in vertical section showing another electrode unit;

FIG. 12 is a view in vertical section of a conventional electrode unit;

FIG. 13 is a fragmentary perspective view of a scum removing device;

FIG. 14 is a diagram of the overall arrangement of a system including the water treating apparatus of the invention.

BEST MODE OF CARRYING OUT THE INVENTION

Figure 6:
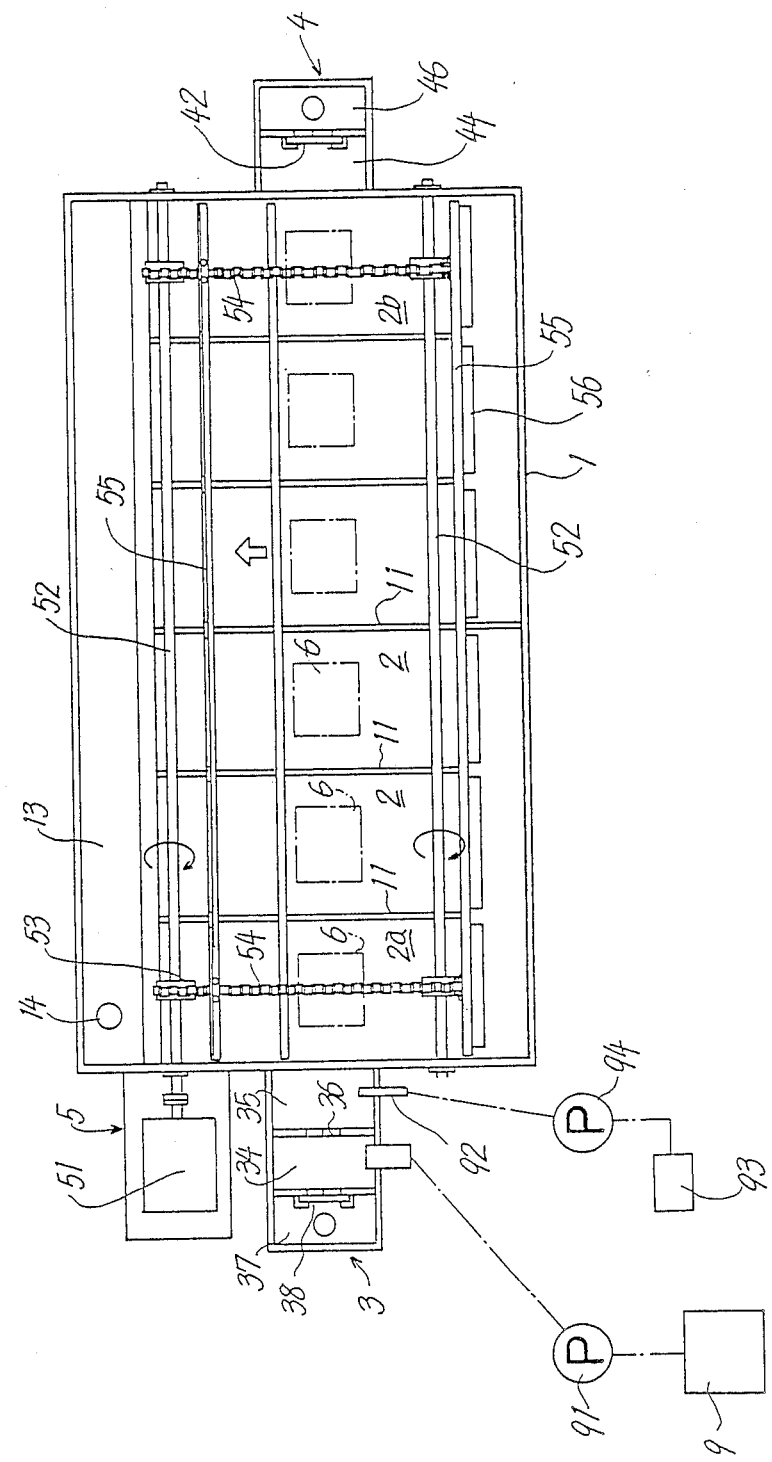
FIG. 6 is a plan view of the same.

FIGS. 1 and 2 show a first embodiment of sewage treating apparatus according to the invention.

A vertically elongated rectangular parallelepipedal container 1 is divided by partitions 11 into an upstream treating tank 2a and a downstream treating tank 2b, which have a first influent chamber 22a and a second influent chamber 22b, respectively, at their bottom portions. The two treating tanks 2a, 2b are in communication with each other through a connecting pipe 25.

The container 1 has at its upper portion a scum chamber 13 adjacent to the two treating tanks 2a, 2b for collecting scum. The chamber 13 has a discharge opening 14 in its bottom.

A sewage influent pipe 30 is connected to the first influent chamber 22a formed at the bottom of the upstream treating tank 2a. The downstream treating tank 2b is formed with a clean effluent opening 41 centrally thereof. Provided in communication with the effluent opening 41 are a first chamber 44 and a second chamber 46 which are separated by a partition having a triangular weir 47 for adjusting the water level in the container 1. Clean water is drawn off from the bottom of the second chamber 46.

The scum removing devices 5 to be described later are arranged at the upper portion of the container 1.

Electrode units 60a, 60b are installed at the bottom portions of the two treating tanks 2a, 2b, respectively. The electrode units 60a, 60b communicate through their lower openings with the influent chambers 22a, 22b, respectively.

Each of the electrode units 60a, 60b comprises a tubular case made of vinyl chloride, FRP or like insulating material, and a first electrode plate 88a (89a), second electrode plate 88b (89b) and third electrode plate 88c (89c) fixedly arranged inside the case at a spacing. Each of the electrode plates has a multiplicity of holes 82 extending vertically therethrough.

The electrode units 60a, 60b measure 280 mm×330 mm×650 mm (height) in exterior size.

Each electrode plate is, for example, a graphite or like carbon electrode and is 20 mm in thickness, 250×300 mm in size and 20 mm in the inside diameter of the holes 82. The spacing between the adjacent electrode plates is 250 mm. The electrode plate has 42 holes 82.

The electrolytic chambers defined by the electrode plates therebetween are packed with a multiplicity of pipe pieces 72. With reference to FIGS. 3 and 4, each pipe piece 72 has a central bore 73, and three through bores 74 formed at each of upper and lower two levels and arranged at a spacing of 120 degrees about the central bore 73, and is formed with a porous hydroxide film over its surface as will be described later. The pipe piece 72 is 40 mm in outside diameter D, 10 mm in the inside diameter C of the central bore 73, 50 mm in height H, 6 mm in inside diameter B of the through bore 74, and 15 mm in distance A from the end of the pipe piece to the center of the through bore 74 adjacent thereto.

The multiplicity of pipe pieces 72 in the electrolytic chambers predominantly include those made of aluminum alloy, and further include 2 to 5% of those made of iron alloy based on the total number. The pipe piece of aluminum alloy is composed of 5.0% of Fe, 4.5% of Mg, 1.0% of Ni, 0.25% of Cr, 0.25% of Zn, 0.2% of Cu and the balance Al. On the other hand, the pipe piece of iron alloy is composed of 1.6% of Ni, 0.9% of Mn, 0.6% of Cr, 0.35% of C, 0.35% of Si, 0.3% of Mo, 0.01% of P, 0.01% of S and the balance Fe.

The aluminum alloy pipe piece 72 is immersed in an aqueous solution of calcium hydroxide adjusted to a pH of 11 for 100 hours and is thereby coated with a hydroxide film having a thickness of about 10 micrometers. The hydroxide film is a porous layer capable of absorbing water as is already known. Accordingly, the pipe pieces 72 in contact with one another in water are electrically connected to one another through the water-containing hydroxide film and release metal ions into the water through the hydroxide film The hydroxide film consists essentially of Al, Mg and Ca (about 90%) and further contains small quantities of Fe, Ni, Cr and the like.

Current is passed through the upstream electrode unit 60a so that the first electrode plate 88a and the third electrode plate 88c serve as positive electrodes, with the second electrode plate 88b serving as a negative electrode. Current is passed through the downstream electrode unit 60b so that the first electrode plate 89a and the third electrode plates 89c serve as negative electrodes, with the second electrode plate 89b serving as a positive electrode. The potential difference between the adjacent electrode plates is set to a low voltage, for example, of about 20 V. Accordingly, no vigorous electrolysis of water occurs in the electrolytic chamber.

Sewage containing about 5 to about 20 ppm of a suitable additive, such as aluminum sulfate, sodium chloride or calcium hydroxide, added thereto before treatment is fed through the influent pipe 30 to the first influent chamber 22a.

The sewage fed to the first influent chamber 22a first flows into the upstream electrode unit 60a, is subjected therein to a primary treatment predominantly involving oxidation and then flows through the connecting pipe 25 and the second influent chamber 22b into the downstream electrode unit 60b, in which the sewage is subjected to a secondary treatment predominantly involving reduction. The water thus treated and cleaned flows out of the effluent opening 41 first into the first chamber 44 and flows over the triangular weir 47 into the second chamber 46, via which the water flows out of the apparatus.

When passing through the upstream electrode unit 60a, i.e. through the first to third electrode plates 88a, 88b, 88c, the sewage is subjected to oxidation, reduction and oxidation alternately in succession, thus becoming oxidized when passing through the third electrode plates 88c.

In this process, contaminants are decomposed, and the chlorine ion present in the sewage combines with free oxygen. The resulting compound serves as an oxidizing agent to react with the surfaces of the pipe pieces 72, consequently forming aluminum hydroxide and iron hydroxide, which are supplied to the sewage.

Further hydrogen gas is evolved at the surface of the second electrode plate 88b serving as the negative electrode, and oxygen gas at the surfaces of the first and third electrode plates 88a, 88b as the positive electrodes. These gases rise in the form of bubbles which are, for example, 10 to 30 micrometers in diameter. The bubbles rise at a velocity of about 1.5 to about 5 cm/sec. The rising bubbles produce in the electrolytic chambers convection, which promotes flocculation of contaminants, while the rising bubbles adsorb flocs to cause then to float at the upper portion of the treating tank 2a.

The hydroxide film on the pipe pieces 72 in the electrolytic chamber, when in a dry state, has electrically insulating properties. In water, each pipe piece 72 is separated from the pipe pieces adjacent thereto by the hydroxide film, whereas since the hydroxide film is porous, these pipe pieces 72 are electrically connected to one another with a resistance value corresponding to the electric resistance of water through the water penetrating into the film.

Consequently, when current is passed between the electrode plates, the pipe pieces 72 filling the electrolytic chamber are charged in accordance with the resistance value, with the result that the interior of the electrolytic chamber is given a distribution of potentials varying from its bottom upward. Metal ions therefore dissolve out from each pipe piece 72 to a concentration according to the potential level concerned.

The sewage supplied to each electrolytic chamber passes through the potential distribution. In the meantime, some contaminants in the sewage undergo an electrolytic reaction each at the potential level specific thereto to separate out on decomposition. The contaminants separating out each have an intrinsic quantity of charge and adsorb to the surface metal ions having an ion concentration in accordance with the charge quantity, whereby almost all the contaminants have their surface charge neutralized, consequently forming numerous metal hydroxide particles.

The metal hydroxide particles readily join to one another upon collision to progressively become flocculated. The flocs adsorb hydrogen gas evolved at the negative electrode and oxygen gas evolved at the positive electrode, become decreased in apparent specific gravity and float at the upper portion of the treating tank.

The multiplicity of pipe pieces 72 in the electrolytic chamber are randomly positioned, forming therebetween numerous clearances communicating with one another, and each have the central bore 73 and six through bores 74, so that the flocs freely pass through these clearances and bores and rise to the upper portion of the treating tank. Accordingly, the flocs will not accumulate in the spaces between the pipe pieces.

When the sewage subsequently passes through the first to third electrode plates 89a, 89b, 89c in the downstream treating tank 2b, the sewage is successively subjected to reduction, oxidation and reduction. The liquid which is in an acid state when flowing into the second influent chamber 22b from the upstream treating tank 2a is restored to a neutralized state upon passing through the third electrode plate 89c in the downstream treating chamber 2b.

In the downstream treating tank 2b, contaminants different from those decomposed in the upstream treating tank 2a are decomposed to form flocs, which rise to the upper portion of the downstream treating tank 2b. The process wherein the contaminants are decomposed, coagulated and flocculated for floating is similar to the process practiced in the upstream treating tank 2a.

The sewage supplied to the upstream treating tank 2a, even if not neutral but acidic or alkaline, is gradually brought closer to neutrality while successively passing through the electrode plates in the upstream and downstream treating tanks 2a, 2b, and is made to have a pH of about 7 when flowing out of the downstream treating tank 2b.

Consequently, the sewage is subjected to a primary treatment chiefly by oxidation in the upstream treating tank 2a and to a secondary treatment chiefly by reduction in the downstream treating tank 2b. The contaminants are decomposed and removed specifically by either one of these treatments in two stages. Since each electrolytic chamber is packed with aluminum alloy pipe pieces 72 which are great in ionization tendency and with iron alloy pipe pieces 72 which are small in this tendency, the potential gradient between the two electrode plates is not uniform throughout the electrolytic chamber but varies randomly from position to position, with the result that each kind of contaminant undergoes a reaction at a particular portion of the potential gradient specific thereto. A wider variety of contaminants can therefore be removed by the present apparatus than by the conventional apparatus shown in FIG. 15.

The scum floating at the upper portions of the upstream treating tank 2a and the downstream treating tank 2b is collected toward a slanting plate 15 at the upper end of the container 1 by the movement of scraper plates 56 of the scum removing devices 5. The scum is then passed over the slanting plate 15 into the scum chamber 13 and delivered outside through the discharge opening 14.

We constructed a sewage purifying system including the above water treating apparatus as seen in FIG. 14.

Experiments were conducted to substantiate the effect of the water treating apparatus of the invention using the system for treating water resulting from a secondary treatment of human wastes, waste water from restaurants, waste water from a food processing factory, waste water from a noodle making factory and sewage. The system had a treating capacity of 2 tons/hour.

The waste water was supplied from a tank 9 to the water treating apparatus 95 through a pump 91, with a suitable additive added to the water from a chemical container 93 by a pump 94. The water treated by the apparatus 95 was sent to a known floatation tank 96 for completely removing the remaining scum from the water.

Some of the results obtained by the experiments are listed in Tables 1 to 5, in which N-Hex stands for normal hexane, T-N for total nitrogen and T-P for total phosphorus.

TABLE 1

| | | | | Water resulting from secondary treatment of human wastes | | | | | |
|---|---|---|---|---|---|---|---|---|---|
| | pH | BOD (ppm) | COD (ppm) | SS (ppm) | N-Hex (ppm) | T-N (ppm) | T-P (ppm) | E. coli (pcs) | Transparency | Color |
| Before treatment | 6.2 | 25 | 29 | 15.2 | 3.4 | 11.4 | 11.2 | $2.7 \times 10^5$ | 20° | Pale yellow, turbid |
| After treatment | 7.2 | 4.2 | 5.3 | 2.5 | 1.0 | 1.5 | 0.15 | 0 | 50° | Colorless, transparent |
| Removal efficiency (%) | | 83.2 | 81.7 | 83.5 | 70.5 | 86.8 | 98.6 | | | |

TABLE 2

| | | | | Waste water from restaurants | | | | | |
|---|---|---|---|---|---|---|---|---|---|
| | pH | BOD (ppm) | COD (ppm) | SS (ppm) | N-Hex (ppm) | T-N (ppm) | T-P (ppm) | E. coli (pcs) | Transparency | Color |
| Before treatment | 8.3 | 51.5 | 426 | 256 | 220 | 46.2 | 21.0 | $2.6 \times 10^3$ | 2° | Pale yellow, turbid |
| After treatment | 7.4 | 14.5 | 11.8 | 3.2 | 2.0 | 3.1 | 0.3 | 0 | 50° | Colorless, transparent |
| Removal efficiency (%) | | 97.1 | 97.2 | 98.7 | 99.0 | 93.2 | 98.5 | | | |

TABLE 3

| | | | | Waste water from food processing factory | | | | | |
|---|---|---|---|---|---|---|---|---|---|
| | pH | BOD (ppm) | COD (ppm) | SS (ppm) | N-Hex (ppm) | T-N (ppm) | T-P (ppm) | E. coli (pcs) | Transparency | Color |
| Before treatment | 6.3 | 134.5 | 82 | 83 | 92 | 42.5 | 26.2 | $1.2 \times 10^4$ | 2° | White, turbid |
| After treatment | 7.3 | 6.5 | 7.4 | 3.8 | 1.0 | 5.5 | 0.2 | 0 | 50° | Colorless, transparent |
| Removal efficiency (%) | | 95.1 | 90.9 | 95.4 | 98.9 | 87.0 | 99.2 | | | |

TABLE 4

| | | | | Waste water from noodle making factory | | | | | |
|---|---|---|---|---|---|---|---|---|---|
| | pH | BOD (ppm) | COD (ppm) | SS (ppm) | N-Hex (ppm) | T-N (ppm) | T-P (ppm) | E. coli (pcs) | Transparency | Color |
| Before treatment | 3.7 | 2200 | 1100 | 295 | 660 | 48 | 62 | $8.8 \times 10^3$ | 1° | Reddish brown |
| After treatment | 7.0 | 25 | 24 | 10.8 | 4.2 | 7.3 | 2.7 | 0 | 35° | Colorless, transparent |
| Removal efficiency (%) | | 98.8 | 97.8 | 96.3 | 99.3 | 84.7 | 95.6 | | | |

TABLE 5

| | pH | BOD (ppm) | COD (ppm) | SS (ppm) | N-Hex (ppm) | Sewage T-N (ppm) | T-P (ppm) | E. coli (pcs) | Transparency | Color |
|---|---|---|---|---|---|---|---|---|---|---|
| Before treatment | 8.1 | 189 | 172 | 166 | 120 | 42.5 | 25.6 | $1.1 \times 10^5$ | 1.5° | Pale yellow, turbid |
| After treatment | 7.4 | 6.7 | 9.4 | 4.4 | 2.0 | 2.3 | 0.17 | 0 | 50° | Colorless, transparent |
| Removal efficiency (%) | | 96.4 | 94.5 | 97.3 | 98.3 | 94.5 | 99.3 | | | |

Contaminants were removed from the waste waters with an efficiency of nearly 100% in respect of COD, BOD, SS and other contents. The waste waters were also deodorized, decolorized and sterilized effectively.

Figure 15:
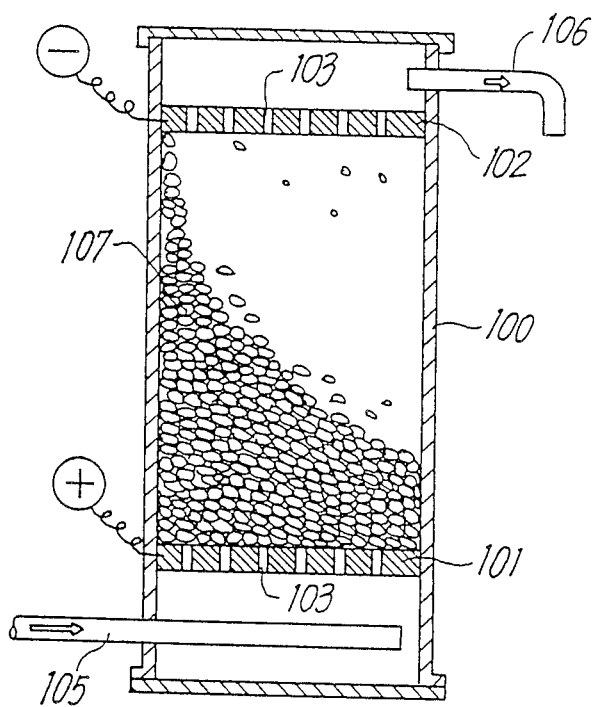
FIG. 15 is a sectional view of a conventional apparatus.

The conventional apparatus shown in FIG. 15 had the problems of being low in treating efficiency and readily permitting accumulation of flocs between the packed spherical pieces 107 to become inoperative continuously.

On the other hand, the soluble metal piece used in the present water treating apparatus is a pipe piece having through holes and is large in effective surface area per unit weight. Moreover, sufficient spaces for the floc-containing water to pass therethrough are formed between such pipe pieces and also in the pipe pieces themselves. This enables the apparatus to operate continuously with a high efficiency.

Furthermore, the voltage to be applied across the electrode plates is low as stated above, and the current flowing between the electrode plates is, for example, about 3 A, hence a greatly decreased power consumption. Additionally, the present apparatus is adapted to purify a wider variety of waste waters than the conventional apparatus and is accordingly very effective also for household use.

The sewage treating apparatus of the present invention is highly efficient, so that if it is used directly for sewage containing large quantities of contaminants, a large amount of contaminant flocs will be formed to fill the spaces between the electrode plates to impede the flow of sewage. Accordingly, it is desirable that the water to be treated be first subjected to primary and secondary treatments by a known water treating apparatus and thereby made free from contaminants to some extent, followed by a tertiary treatment with use of the present apparatus to eventually remove the remaining contaminants from the water completely along with deodorization and decolorization. The apparatus is therefore suitable, for example, as a water treating apparatus for purifying industrial water into drinking water.

OTHER MODES OF CARRYING OUT THE INVENTION

FIGS. 5 to 7 show a second embodiment of sewage treating apparatus of the invention.

A container 1 is made of FRP or like insulating material and has its interior divided into a plurality of treating tanks 2 by partitions 11.

The container 1 has at its upper portion a scum chamber 13 adjacent to the treating tanks 2 and formed with a scum discharge opening 14 in its bottom.

Each treating tank 2 has at its lower portion a bottom plate 21 dividing the interior into lower and upper portions, i.e., into an influent chamber 22 and a treating chamber 23.

The bottom plate 21 has a mount aperture 24 for an electrode unit 6 to fit in. The water in the influent chamber 22 flows upward through the electrode unit 6 for treatment and thereafter flows into the treating chamber 23.

The first treating tank 2a is provided with a feed portion 3 at its upstream side. A connecting pipe 31 holds the feed portion 3 in communication with an influent opening formed in the wall of the tank influent chamber 22.

The last treating tank 2b is provided with an effluent portion 4 and communicates therewith through an effluent opening 41 formed in the side wall of the tank.

The treating chamber 23 of each treating tank has an effluent opening communicating with an influent opening of the influent chamber 22 of the downstream treating tank adjacent thereto through a connecting pipe 25. The water filling the treating chamber 23 flows through the connecting pipe 25 into the influent chamber 22 downstream therefrom. Thus, the water passes through the treating tanks 2 from stage to stage and is thereby treated repeatedly.

The feed portion 3 is divided into three chambers by two partition plates 32, 33. The water to be treated is supplied from a water tank 9 to the second chamber 34 by a pump 91.

The partition plate 32 between the second chamber and the third chamber 35 is provided with a triangular weir 36. The water flows from the second chamber 34 into the third chamber 35 over the weir, whereby the quantity of water to be fed to the treating tank 2a through the connecting pipe 31 is measured.

The partition plate 33 between the second chamber 34 and the first chamber 37 is provided with a regulating plate 38 which is slidable upward or downward. By controlling the quantity of water flowing into the first chamber 37 over the partition plate and through an opening 39 in the regulating plate and returning to the water tank 9, the quantity of water overflowing the triangular weir 36 is determined to determine the water level in the container 1.

The third chamber 35 is provided with a chemical applicator nozzle 92, through which a suitable chemical solution, such as aluminum sulfate, sodium chloride or calcium hydroxide solution, for promoting coagulation of the contaminants in the water is added dropwise to the water from a chemical container 93 by an applicator pump 94 to a concentration of 5 to 20 ppm.

The effluent portion 4 is divided into two chambers by a partition plate 43 having a slide plate 42. The treated water flowing out through the effluent opening 41 of the last treating tank 2b passes through the first chamber 44 and an opening 45 in the slide plate 42 into the second chamber 46 and is discharged.

The container 1 is provided at its upper portion with a scum removing device 5 which is driven by a motor 51. As shown in FIGS. 6, 7 and 13, the device comprises two parallel rotary shafts 52, 52 extending above the treating tanks 2, two endless chains 54, 54 reeved around sprockets 53, 53 on the parallel shafts, a plurality of bracket bars 55 fastened to the chains, and flexible scraper plates 56 secured to the bracket bars 55 and positioned in corresponding relation to the treating tanks.

As seen in FIGS. 5 and 7, the influent chamber 22 of each treating tank is provided with a pipe 27 for injecting ozone-containing water. The pipe has an open forward end positioned under the electrode unit 6. By way of a pump 28 the injecting pipe 27 is connected to a device 29 for producing ozone-containing water. The ozone-containing water is released into an inlet 62 of the electrode unit 6, admixed with the water to be treated and passed through the electrode plates, thereby preventing deposition of hydroxides and like reaction products on the plates and promoting separation of such products therefrom.

The ozone-containing water, when having a concentration of 230 mg/100 liters, is added at a rate of 100 liters/hour when sewage or waste water is treated at a rate of 6 tons/hour.

While the electrode unit 6 can be of various constructions, FIG. 8 shows an example thereof which comprises a tubular case 61 made of vinyl chloride, FRP or like insulating material, and negative electrode plates 8 and positive electrode plates 81 arranged alternately within the case. Each of the electrode plates 8, 81 is formed with a multiplicity of holes 82 for passing therethrough the water to be treated.

The case 61 is open at its lower and upper ends to provide the inlet 62 and an outlet 63 for the water, and has an outward flange 65 projecting therefrom at a level lower than the lowermost electrode plate and provided with a packing 64 on its lower face. Accordingly, when the electrode unit 6 is placed on the bottom plate 21 of the treating tank 2, the lower portion of the case 61 is fittable in the mount aperture 24 formed in the bottom plate, with the flange 65 resting on the aperture-defining edge of the bottom plate. Thus, the unit 6 closes the mount aperture 24 and can be installed in place removably.

As seen in FIG. 9, each of the electrode plates 8, 81 is square and 13 cm in the length of each side. While the number, arrangement and diameter of the holes 82 can be determined as desired, the illustrated example has holes 82 having a diameter of 10 mm and arranged in five rows horizontally and vertically.

The electrode plates 8, 81 as arranged alternately are held from above and below by stays 66 adhered to the inner surface of the case. Screws 84 are driven through the case side wall into the electrode plates. The screws driven into the positive electrode plates 81 are grouped and electrically connected together, and those driven into the negative electrode plates 8 are similarly connected together. The two groups are separately connected to electric wires 7 extending into the tank from outside. The portions of the screws 84 projecting from the case side wall and connecting wires 85 are covered and insulated with a liquid-tight insulating casing 86.

The outer ends of the electric wires 7 extend outward through a leading-out tube 12 projecting obliquely upward from the front wall of the treating tank 2 as seen in FIG. 7 and are fastened to a terminal board 71 on the container 1 to supply current to the electrode plates of the unit 6.

With reference to FIG. 10, each negative electrode plate 8 comprises a 10-mm-thick aluminum panel 87 sandwiched between 1-mm-thick titanium panels 83 which are fastened to the panel 87 with plastics screws 84 extending therethrough. The aluminum panel 87 is made of aluminum or an aluminum alloy composed, for example, of 5.0% Fe, 4.5% Mg, 1.0% Ni, 0.25% Cr, 0.25% Zn, 0.2% Cu and the balance Al. The aluminum panel can be replaced by a panel of iron, an iron alloy composed, for example, of 1.6% Ni, 0.9% Mn, 0.6% Cr, 0.35% C, 0.35% Si, 0.3% Mo, 0.01% P, 0.01% S and the balance Fe, or other soluble metal.

A panel of graphite or like carbon is used as the positive electrode plate 81.

FIG. 11 shows an electrode unit 6 as installed in the treating tank 2 in a different mode. The tank 2 has no influent chamber, but an influent opening 26 is formed in the partition wall 11 at its lower end. The electrode unit 6 is closed with a bottom wall 67 at the lower end of its case 61 and has an inlet 62a formed in the case side wall and an influent chamber 68 defined by the bottom wall 67.

When the electrode unit 6 is placed on the bottom of the treating tank 2, the influent opening 26 coincides with the inlet 62a. The unit 6 can be positioned in place by an engageable portion thereon fitting into an engaging portion formed at the opening edge.

Like the water treating apparatus shown in FIG. 1, the water treating apparatus described is used for purifying waste water subjected to primary and secondary treatments. However, the present apparatus is adapted to exhibit slightly lower treating performance than the one shown in FIG. 1 to treat sewage or waste water having a relatively high concentration. Accordingly, the apparatus is suitable, for example, for decolorizing the waste water from dyeing factories.

The apparatus shown in FIG. 5 has the electrode unit of FIG. 8 in each treating tank and is thus adapted to treat the water resulting from the secondary treatment. For treating untreated waste water, it is desirable to use the electrode unit 6a of FIG. 12 in the first stage and the electrode unit 6 of FIG. 8 in the second and subsequent stages.

The electrode unit 6a of FIG. 12 comprises electrode plates 8a, 81a provided vertically in a case 61 and so arranged as to alternate in polarity. The water to be treated flows upward along the planes of the electrode plates and is thereby subjected to an electrical action, which causes the majority of contaminants to separate out. The treated water is then fed to the influent chamber of the next treating tank, in which the water is efficiently treated by the electrode unit 6 of FIG. 8.

When passing through the electrode unit 6, i.e. through the electrode plates, the waste water is electrically acted on greatly and subjected to oxidation and reduction alternately.

In this process, contaminants are decomposed, and the chlorine ion present in the sewage combines with free oxygen. The resulting compound serves as an oxidizing agent to react with the negative electrode plate, consequently forming aluminum hydroxide and iron hydroxide which separate out in the water.

Further hydrogen gas is evolved at the surface of the negative electrode plate 8, and oxygen gas at the surface of the positive electrode plate 81. These gases rise in the form of bubbles which are, for example, 10 to 30 micrometers in diameter. The bubbles rise at a velocity of about 1.5 to about 4.5 cm/sec. The rising bubbles produce convection between the electrode plates and within the treating chamber 23, thereby promoting flocculation of contaminents, while the rising bubbles adsorb flocs to cause then to float at the upper portion of the treating chamber 23.

The waste water supplied to the first treating tank 2a, even if not neutral but acidic or alkaline, is gradually brought closer to neutrality while successively passing through the electrode plates in the electrode units and is made to have a pH of about 7 when flowing out of the last electrode unit 6.

The waste water is subjected by the negative electrode plate 8 to a treatment predominantly involving reduction and by the positive electrode plate 81 to a treatment predominantly involving oxidation. The water is thus treated in two stages repeatedly a number of times, whereby the contaminants are decomposed and removed specifically by either of these treatments.

Using the water treating apparatus described, we constructed a sewage or waste water purifying system like the one shown in FIG. 14 and already described with reference to the first embodiment.

When required, the device 29 is operated to inject ozone-containing water into the treating apparatus or the waste water supply channel via the pump 28.

With the conventional apparatus shown in FIG. 15, the surface of the negative electrode plate 102 becomes covered with an insulating hydroxide owing to oxidation to result in impaired performance and cause trouble to the apparatus when it is to be operated continuously for a long period. In view of this problem, we have found that when ozone-containing water is admixed with the water to be treated and brought into contact with the negative electrode during the electrochemical treatment, the electrode plate is less susceptible to the deposition of hydroxides and reaction products. We applied this principle to the water treating apparatus.

The ozone-containing water decomposes the deposit on the negative electrode plate and removes the deposit, permitting the electrode to retain its electrolytic action without being becoming covered with the insulating products unlike the conventional case and rendering the apparatus operable continuously for a prolonged period.

An experimental water treating apparatus having the construction of FIG. 5 was used for treating various waste waters as subjected to the secondary treatment. The results are given below.

Electrode units: unit of FIG. 8 for the second treating tank, and unit of FIG. 12 for the other tanks.
Voltage, current: d.c. 20 V, 1 A.
Flow rate: 200 liters/hour.

| Experiment 1 Treatment of waste water from noodle making process | | |
|---|---|---|
| Item | Before treatment | After treatment |
| Odor | Putrid odor | Slight odor |
| pH value | 7.2 | 7.3 |
| Color | 30 degrees | 4 degrees |
| Turbidity | 6 degrees | 1 degree |
| KMnO4 consumption | 6.2 mg/liter | 4.0 mg/liter |
| Common bacteria | 3.2 × 10² cells/ml | Not detected |

| Experiment 2 Treatment of livestock wastes | | |
|---|---|---|
| Item | Before treatment | After treatment |
| pH value | 8.1 | 5.9 |
| COD-manganese | 543 mg/liter | 91.2 mg/liter |
| BOD | 370 mg/liter | 19 mg/liter |

| Experiment 3 Treatment of dairy wastes (as treated with active carbon) | | |
|---|---|---|
| Item | Before treatment | After treatment |
| pH value | 7.2 | 6.9 |
| Color | 30 degrees | 3 degrees |
| Turbidity | 120 degrees | 1 degree |
| KMnO4 consumption | 29.4 mg/liter | 9.3 mg/liter |
| Common bacteria | 380 cells/ml | 1 cell/ml |
| E. coli | 4.2 × 10² cells/ 100 ml MPN | Not detected |

| Experiment 4 Treatment of industrial water | | |
|---|---|---|
| Item | Before treatment | After treatment |
| Color | 12 degrees | 2 degrees |
| Turbidity | 6 degrees | 1 degree |
| Common bacteria | 640 cells/ml | Not detected |

Apparently very high removal efficiencies were achieved for the waste waters.

The construction of the present apparatus is not limited to those of the foregoing embodiments but can of course be modified variously within the technical scope defined in the appended claims.

For example, the polarity of voltage to be applied to the electrode plates of FIG. 1 may be reversed. The number of electrode plates to be installed in the treating tank is not limited to 3 but can be 5 or a greater odd number. Further the number of treating tanks to be provided side by side is not limited to 2 but can be 4 or a greater even number.

The metal pieces to be packed in the electrolytic chamber are not limited to pipe pieces but may be, for example, tetrapod pieces.

The effluent from the scum chamber 13 shown in FIG. 2 or 6 contains the additive added to the water to be treated although the amount thereof is very small. Accordingly, the effluent, as separated from the scum, can be fed to the apparatus via the connecting pipe to effectively utilize the additive.

Furthermore, a greatly improved removal efficiency can be achieved by arranging an increased number of electrode plates 8, 81 in the case shown in FIG. 8, installing two or more electrode units in each treating tank 2, or increasing the number of treating tanks 2 to be provided in the container 1.

I claim:
1. A water treating apparatus comprising:
a plurality of treating tanks having an insulated inner surface connected together in series, the most upstream treating tank having an influent opening, the most downstream treating tank having an effluent opening,
each of the treating tanks having an electrode unit at a bottom portion thereof, each electrode unit having a tubular case made of an insulating material and formed with a water inlet and a water outlet in a lower portion and an upper portion thereof, respectively, a plurality of electrode plates, each formed with a multiplicity of holes and arranged within the case one above another at a spacing, the electrode plates defining an electrolytic chamber therebetween, wherein current is so passed that adjacent electrode plates are different in polarity, with the uppermost electrode plate in each upstream treating tank differing in polarity from the lowermost electrode plate in the downstream treating tank adjacent thereto, and a multiplicity of soluble metal pieces, each formed with a porous hydroxide film over the surface, the metal pieces being packed in the electrolytic chamber and forming therebetween a multiplicity of clearance for passing therethrough the water to be treated.

2. A water treating apparatus as defined in claim 1 wherein the treating tanks are arranged in an even number of stages and connected together in series, and the electrode unit in each treating tank has an odd number of electrode plates.

3. A water treating apparatus as defined in claim 1 wherein each of the soluble metal pieces is a pipe piece (74) having a plurality of bores (74) extending through the peripheral wall thereof.

4. A water treating apparatus as defined in claim 3 wherein the electrolytic chamber is packed with a multiplicity of aluminum alloy pipe pieces and a small number of iron alloy pieces in mixture.

5. A water treating apparatus as defined in claim 1 wherein each treating tank is provided with an ozone injecting pipe having an open forward end directed toward the lowermost electrode plate of the electrode unit.

6. A water treating apparatus as defined in claim 1 wherein a scum receptacle is provided externally of the treating tanks along the outer walls of the treating tanks at one side of the row of tanks, and a scum removing device is disposed at an upper opening portion of each treating tank for scraping scum floating on the surface layer of the treated water toward the scum receptacle.

7. A water treating apparatus comprising:

a plurality of treating tanks having an insulated inner surface connected together in series, the most upstream treating tank having an influent opening, the most downstream treating tank having an effluent opening, each of the treating tanks having an electrode unit at a bottom portion thereof, each electrode unit having a tubular case made of an insulating material and formed with a water inlet and a water outlet in a lower portion and an upper portion thereof, respectively, a plurality of electrode plates, each formed with a multiplicity of holes and arranged within the case one above another at a spacing, wherein current is so passed that adjacent electrode plates are different in polarity, with the uppermost electrode plate in each upstream treating tank differing in polarity from the lowermost electrode plate in the downstream treating tank adjacent thereto, and the electrode plate serving as a negative electrode including a flat soluble metal panel formed with a multiplicity of holes, and a pair of titanium panels joined respectively to front and rear surfaces of the soluble metal panel and each formed with a multiplicity of holes communicating with the respective holes in the soluble metal panel.

8. A water treating apparatus as defined in claim 7 wherein the soluble metal panel is an aluminum panel.

9. A water treating apparatus as defined in claim 7 wherein the soluble metal panel is an iron panel.

10. A water treating apparatus as defined in claim 7 wherein the treating tanks are arranged in an even number of stages and connected together in series, and the electrode unit in each of the treating tanks has an odd number of electrode plates.

11. A water treating apparatus as defined in claim 7 wherein each of the treating tanks is provided with an ozone injecting pipe having an open forward end directed toward the lowermost electrode plate of the electrode unit.

12. A water treating apparatus as defined in claim 7 wherein a scum receptacle is provided externally of the treating tanks along the outer walls of the treating tanks at one side of the row of tanks, and a scum removing device is disposed at an upper opening portion of each treating tank for scraping scum floating on the surface layer of the treated water toward the scum receptacle.

* * * * *